(12) United States Patent
Leisinger et al.

(10) Patent No.: US 7,633,018 B2
(45) Date of Patent: Dec. 15, 2009

(54) METHOD OF OPERATING A BALANCE, AND BALANCE

(75) Inventors: Roger Leisinger, Zürich (CH); Hansruedi Künzi, Greifensee (CH)

(73) Assignee: Mettler-Toledo AG, Greifensee (CH)

( * ) Notice: Subject to any disclaimer, the term of this patent is extended or adjusted under 35 U.S.C. 154(b) by 94 days.

(21) Appl. No.: 10/968,117

(22) Filed: Oct. 20, 2004

(65) Prior Publication Data

US 2005/0092529 A1    May 5, 2005

(30) Foreign Application Priority Data

Oct. 21, 2003   (EP) .................................. 03103894

(51) Int. Cl.
  *G01G 19/22* (2006.01)
(52) U.S. Cl. .................................... 177/25.13; 702/173
(58) Field of Classification Search ... 177/25.11–25.19; 702/173
  See application file for complete search history.

(56) References Cited

U.S. PATENT DOCUMENTS

| | | | | |
|---|---|---|---|---|
| 4,789,034 A * | 12/1988 | Luchinger et al. | ........... | 177/181 |
| 4,862,401 A | 8/1989 | Kubli et al. | | |
| 4,969,112 A * | 11/1990 | Castle | ........ | 702/173 |
| 4,992,775 A * | 2/1991 | Castle et al. | ................ | 340/525 |
| 5,306,875 A | 4/1994 | Schmitzek | | |
| 6,246,018 B1 * | 6/2001 | Schink | ........ | 177/180 |
| 6,373,570 B1 | 4/2002 | McFarland et al. | | |
| 6,401,519 B1 | 6/2002 | McFarland et al. | | |
| 6,441,901 B2 | 8/2002 | McFarland et al. | | |
| 6,507,306 B1 * | 1/2003 | Griesau et al. | ............. | 341/176 |
| 6,590,166 B2 * | 7/2003 | Yoshida | ................... | 177/25.13 |

(Continued)

FOREIGN PATENT DOCUMENTS

DE         39 24 236 A1    2/1990

(Continued)

OTHER PUBLICATIONS

Wikipedia: Bluetooth :: en.wikipedia.org/wiki/Bluetooth; Jun. 5, 2005.*

(Continued)

*Primary Examiner*—Vit W Miska
*Assistant Examiner*—Sean Kayes
(74) *Attorney, Agent, or Firm*—Buchanan Ingersoll & Rooney PC (57) ABSTRACT

A method is disclosed to operate and control a balance which has a control unit that is operable to execute an operating- and/or applications program and is equipped for this task with a processor and a memory unit. The balance also has at least one entry device to give command signals to the control unit. The control unit uses the command signals given by the entry device to control one of at least two function modules that are assigned to the entry device by the control unit dependent on the operating status of the operating and/or applications program. The entry device can therefore control a plurality of function modules, hardware and/or software modules, e.g., for the opening and closing of the doors of the weighing compartment, the zeroing of the balance, the setting of tare, or the printing of the measurement results. The assignment of the function modules to the entry device is signaled to the user by an indicating device. The user is further given a confirming signal by a feedback device after the entry device has been actuated. The entry device, the indicating device, and the confirming feedback device can be arranged separate from the balance in the housing of a freely movable input unit.

28 Claims, 3 Drawing Sheets

U.S. PATENT DOCUMENTS

| | | | |
|---|---|---|---|
| 6,849,460 | B2 | 2/2005 | McFarland et al. |
| 6,891,113 | B2 * | 5/2005 | Fringeli et al. .............. 177/238 |
| 7,076,115 | B2 | 7/2006 | Crevier et al. |
| 2002/0120750 | A1 | 8/2002 | Nidd |
| 2003/0061177 | A1 | 3/2003 | Blanluet et al. |
| 2003/0136590 | A1 | 7/2003 | Gluvakov |
| 2004/0268391 | A1 * | 12/2004 | Clercq et al. .................. 725/37 |

FOREIGN PATENT DOCUMENTS

| | | |
|---|---|---|
| DE | 200 17 177 U1 | 3/2001 |
| DE | 101 34 281 A1 | 1/2003 |
| DE | 203 04 465 U1 | 9/2003 |
| EP | 0 216 035 A2 | 4/1987 |
| GB | 2 234 356 A | 1/1991 |
| WO | WO 98/15964 | 4/1998 |

OTHER PUBLICATIONS

Wikipedia: Bluetooth :: en.wikipedia.org/wiki/Bluetooth; Jun. 6, 2004.*

U. Tietze, Ch. Schenk, *Halbleiterschaltungstechnik*, $11^{th}$ edition, $2^{nd}$ printing, Springer Verlag, Berlin 1999, in chapter 23, pp. 1221-1223.

"Wägen und Dosieren in explosionsgefährdeten Bereichen." Wägen + Dosieren May 1990, pp. 2-5, 8, 12,-14. (with English Summary translation of p. 4, last column, and Figures 5 and 6).

"Brief- und Paket Waage DPE 34 E Bedienungsanleitung." Bizerba 6.819.98.5.00.00, Sections 1-2 to 7-4. (with English Summary translation of Operating Instructions DPE 34 E, Sections 0 to 7).

"Auswertegerät ITE-Ex für Elektromechanische Waagen zum Einsatz in Zone 1." Bizerba, pp. 1-5, 7. (with English Summary ).

* cited by examiner

METHOD OF OPERATING A BALANCE, AND BALANCE

CROSS REFERENCE TO RELATED APPLICATIONS

This application claims priority under 35 U.S.C. §119 to European Application No. 03103894.6 filed in Europe on 21 Oct. 2003, the entire contents of which are hereby incorporated by reference in their entirety.

BACKGROUND

The invention relates to a method of operating a balance, and it further relates to a balance which has a control unit that serves to execute an operating- and/or applications program and is equipped for this task with a processor and a memory unit and which also has at least one entry device that serves to give command signals to the control unit, wherein the control unit uses the command signals given by the entry device to control one of at least two function modules that are assigned to the entry device by the control unit dependent on the operating status of the operating and/or applications program.

A modern balance, in particular an analytical balance or a precision balance, is operated and controlled preferably without manual intervention in the functional elements of the balance, by means of an input unit from which command signals are given to the modules that are provided in the balance. For example the opening and closing of parts of the housing is performed by means of motors, each of which is controlled by signals that are given by the input unit which is equipped with entry devices and or operating elements. Each entry device or each operating element includes a sensor that serves to register influencing factors and convert them into electrical signals.

As described in the European patent EP 0 216 035 B1, the disclosure of which is hereby incorporated by reference in its entirety, different sensors can be used for the control of a balance, where the sensors can in some cases also be integrated in the balance housing or arranged in a housing that is separate from the balance housing. For example, the modules of the balance as well as the weighing process can be controlled by speaking verbal commands into a microphone, or by means of a proximity switch, by means of pressure-sensitive keys, and/or by means of a switch that is arranged in a foot pedal. It is further possible to use a so-called soft key to which a selected function is given through a fixed assignment.

The U.S. Pat. No. 6,246,018 B1, the disclosure of which is hereby incorporated by reference in its entirety, discloses a balance with a motor-driven draft-protection device which has at least one sensor that serves to register the position of individual panels of the draft-protection device. Thus, the fact that an opened panel is at its end position can be registered and stored. A desired configuration of panels that are to be open or shut can be set by way of a learning function. Subsequently, the draft-protection device can be opened and closed in the set configuration by pressing a dedicated key. In this arrangement, the sensors register the respective states "open" or "closed", and when the key is actuated, the panels are either closed or opened, depending on their current state.

In addition, a balance with an antenna is known from the German patent application publication DE 101 34 281 A1, the disclosure of which is hereby incorporated by reference in its entirety, where the antenna serves to receive signals from a transponder that is attached to the object that is to be weighed. Under this concept, data called up from the transponder can be used to control the balance.

A description of sensors that serve to register a diversity of physical quantities, for example force, pressure, sound and light intensity, and to convert them into electrical signals is found in U. Tietze, Ch. Schenk, Halbleiterschaltungstechnik, 11$^{th}$ edition, 2$^{nd}$ printing, Springer Verlag, Berlin 1999, in chapter 23, pages 1221-1223, the disclosure of which is hereby incorporated by reference in its entirety.

In the operation of the balances according to the known state of the art, the user is faced with the task of actuating the correct entry devices, operating elements, or sensors in each phase during the weighing process. It is therefore necessary to provide the balance with the required number of input units with entry devices or operating elements or sensors. The user, on the other hand, is required to take notice of and correctly select among the often numerous input possibilities.

As a result, there are often undesirable time losses associated with the operation of the balance, particularly in fast-paced weighing processes.

SUMMARY

A method is disclosed by which the balance can be operated in a more advantageous way that is simpler, more flexible and faster, and to also provide a balance that functions according to this method.

A method of operating a balance and a balance, are disclosed.

The method serves to operate and control a balance which has a control unit that serves to execute an operating- and/or applications program, and which further has at least one entry device that serves to enter command signals into the control unit, wherein the control unit uses the command signals given by the entry device to control one of at least two function modules that are assigned to the entry device by the control unit dependent on the operating status of the operating- and/or applications program. The at least one entry device is arranged separate from the balance in the housing of a freely movable input unit.

The user is informed through one or more optical indications about the assignment of the function modules to the entry device, which makes the weighing process convenient to control. The freely movable input unit is equipped with indicator means, in particular light-emitting diodes which indicate the currently assigned function module, and/or a small liquid crystal indicator device is fitted to the housing of the freely movable input unit. In particular, the freely movable input unit is equipped with an acoustical and/or optical feedback device which cooperates with the entry device, for example a conspicuously placed light-emitting diode that gives a confirming feedback signal to the user when the entry device has been actuated.

This gives the user the confidence that the entry device has been triggered, whereby the reliability of the method is increased.

In an exemplary embodiment, a change in the assignment where a new function module is assigned to the entry device during the execution of the operating program and/or applications program is likewise signaled by means of a feedback signal device.

It is therefore possible to control several function modules with the at least one entry device, such as hardware- and/or software modules that are used, e.g., for opening and closing the doors of the weighing compartment, for the zero-setting of the balance, the tare function, or the printing of the measured results. In each of these phases of the weighing process, the currently required function module is assigned to the entry device. Thus the attention of the user can be focused completely or to a large extent on the operation of the entry device. However, exemplary embodiments also include the possibility that information resulting from the weighing process, e.g., data belonging to the weighing sample, is registered by the entry device.

If a direct intervention by the user in a measuring process becomes necessary where it is not possible for the user to operate an indicating- and operating unit of the balance, the user can position the freely movable input unit at a suitable location, if necessary even inside the weighing compartment, in order to control the weighing process comfortably, for example with a hand- or finger movement. This allows the user to work with his hands in a so-called glove box or flow box and to control the weighing process rapidly and conveniently without interruption.

The particular advantage of operating a balance by means of an entry device based on a work sequence, for example an applications program, lies in a simplified and therefore more economical operation of the balance.

It is further possible to connect the input unit simultaneously to a balance and to an additional device. For example, a balance and a conveyor device connected to the balance are connected to an input unit of this kind, which can also have two entry devices, one of which is used to control the balance and the other to control the conveyor device.

In principle, the input unit can be anything from a very simple terminal to an intelligent terminal. In the most basic embodiment, the input unit comprises a switch that is connected by way of a cable to an input of the balance. More complex configurations may include input units that are processor-controlled, equipped with network modules, equipped with a display, and capable of multi-channel operation.

An advantageous embodiment of the balance has a further input unit with operating elements, e.g., an indicating and operating unit. This arrangement is practical as it allows a flexible use of the balance in cases where the balance needs to be operable with entry devices according to the present invention as well as in the conventional mode.

The operating elements are for example function keys that are integrated in a further input unit that was referred to above, or in a keyboard that is arranged in a housing, or in a touch-sensitive liquid crystal display.

At least one entry device can be arranged in the housing of the balance or in the housing of this further input unit.

The balance functions that can be executed by means of the entry device are preferably identical to the balance functions that can be executed by means of the operating elements of the further input unit, e.g., an indicating and operating unit. With an appropriate choice of the procedural steps of the weighing process, it is therefore possible that the process control is performed exclusively by means of the at least one entry device.

If the entry devices are integrated together with the operating elements in a housing of the further input unit, the manufacturing cost will be lower. On the other hand, using a wireless or wire-connected freely movable input unit in which the entry devices are integrated provides the balance with remote control capability, whereby the undesirable influences on the measuring process are avoided which can be caused by manipulations on the balance. Furthermore, the user is free to choose a convenient location from which to control the weighing process. For example, the user can control the weighing process from his work station at a remote location from the balance. A wireless or wire-connected input unit according to the invention is freely movable and simple to relocate. It can also be mounted in different places by means of a holder, e.g., on the wall or on the work surface.

Thus, a freely movable, wireless or wire-connected unit helps to improve the ergonomic aspects and increase the flexibility in the application of the balance.

After an input unit that is equipped, e.g., with a processor and a memory module has been connected to the balance, or to a further input unit or interface junction box which may be part of the layout, the control unit reads data which are stored in the freely movable and in this case wireless input unit and which relate to the freely movable input unit itself and/or to the user of the input unit, so that the system consisting of the balance and the two input units can be configured correctly. For example, if the freely movable wireless or wire-connected input unit is equipped with a microphone as an entry device, the control unit will activate an adapter module that supports the voice-controlled operation, converting audio signals into digital instructions that are suitable for the control of the function module that they are addressed to.

In a further advantageous embodiment, the control unit and the freely movable wireless or wire-connected input unit include network modules that work, e.g., according to the Bluetooth™ standards, so that they are capable of detecting the presence of services offered by the input unit and of using the services after the communication has been established. These so-called salutation- and service discovery protocols which permit the automatic joining of a component to a network as well as the required reconfiguration of the network are described in U.S. Patent Application Publication 2002/0120750 A1, the disclosure of which is hereby incorporated by reference in its entirety.

The user can therefore use a freely movable input unit of a type which is suitable for the communication with different laboratory instruments and is capable of automatically establishing communication with a balance.

BRIEF DESCRIPTION OF THE DRAWINGS

The invention will hereinafter be described in more detail based on drawings, wherein.

DETAILED DESCRIPTION

Figure 1:
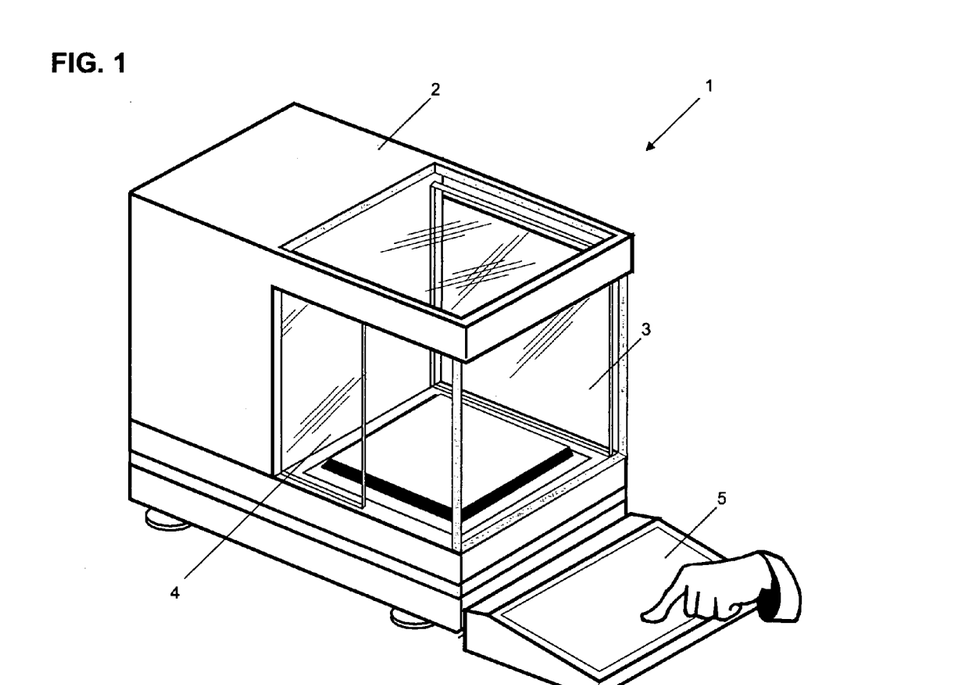
FIG. 1 illustrates an exemplary balance 1 that is controlled by means of an indicating and operating unit 5, with a weighing compartment 3 that is arranged in a housing and can be automatically opened and closed by sliding doors 4.

FIG. 1 shows an exemplary balance 1 that is controlled by means of a further input unit, in this case an indicating and operating unit 5. The balance housing 2 contains a weighing compartment 3 that can be automatically opened and closed by means of sliding doors 4.

Figure 2:
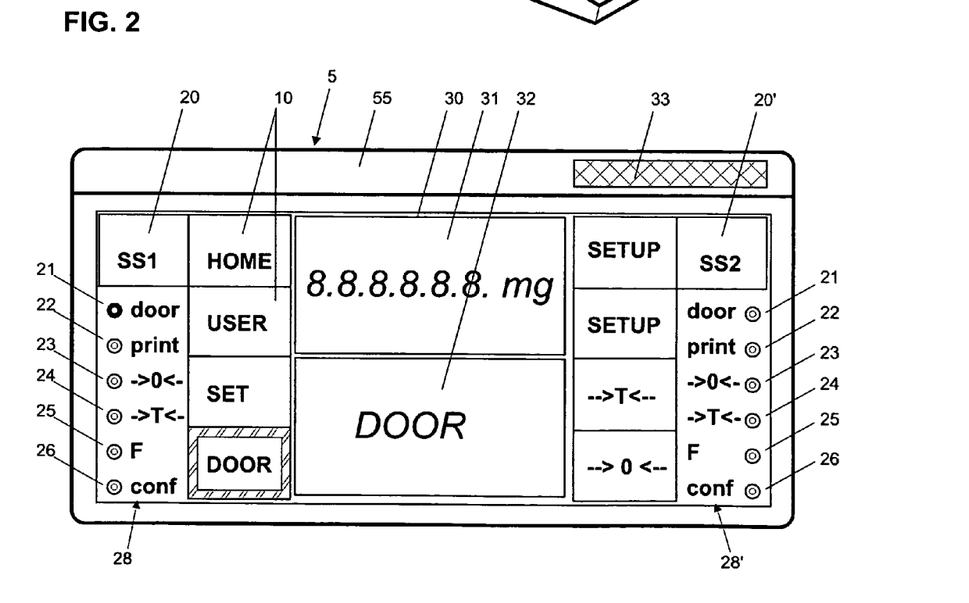
FIG. 2 illustrates a further exemplary input unit configured as an indicating and operating unit 5 of the balance 1, equipped with a plurality of operating elements 10 and two entry devices 20, 20'.

FIG. 2 represents a plan view of the indicating and operating unit 5 that belongs to the balance 1 and has a housing 55 which contains a plurality of operating elements 10 and two entry devices 20, 20' as well as an indicating module, e.g., a liquid crystal display 30 with two sections 31, 32, or light-emitting diodes 21, ..., 26, and a loudspeaker 33. The light-emitting diodes 21, ..., 26 can be arranged below an associated entry device 20, 20' following each other from top to bottom in a field 28, 28' at the outside border of the indicating and operating unit 5. The width of the field 28, 28' can be narrower than shown in FIG. 2, limited to the width of pictorial symbols that are backlit by respective light-emitting diodes 21, ..., 26.

The balance 1 can be operated in a conventional manner by means of the operating elements 10, which may be realized, e.g., in the form of mechanical, electronic or optoelectronic switches.

The keys <→0←> and <→T←> serve to execute the functions "zero" and "tare". The drive mechanism for the doors and the transfer of the measuring results to a printer are controlled by the keys labeled <DOOR> and <PRINT>, respectively. Furthermore, the balance 1 and the measuring procedures that are performed by the balance can be configured and their parameters can be set by means of the keys labeled <SETUP> and <APPL>. In addition, the key labeled <USER> serves to store user-specific data in the balance 1.

However, the balance functions of zero-setting, tare-setting, operating the doors and printing can also be realized with each of the two entry devices 20, 20' which are configured, e.g., as mechanical, electronic, or optoelectronic switches. In an exemplary embodiment, the entry devices 20, 20' are configured as infrared- or ultrasound proximity switches. Based on the operating and/or applications program 61 of the balance 1, the control unit 6 inside the balance 1 (see FIG. 4) can assign to each of the two entry devices 20, 20' a respective balance function, or a respective function module 71, 72, ... that serves to execute the respective balance function. The term operating program in the present context means a program that ensures the operation and the control of the function modules of the balance 1, which also includes the standard operating mode of the balance 1. The term applications program refers to a program or a group of programs by which a certain predetermined or configurable weighing process can be executed with the help of the function modules.

The balance functions of zero-setting, tare-setting, operating the doors and printing, which can be assigned to the entry devices 20, 20', as well as a freely selectable balance function "F", are marked below the entry devices 20, 20' on the respective field 28, 28' as words or symbols and can be signaled by associated light-emitting diodes 21, ..., 25. The illustrated arrangement in the border area of the indicating and operating unit 5 is particularly advantageous as the lighting of the signals at this location is conspicuously visible, and because it is an optical signal, it is easily noticeable even in a noisy environment.

After an assignment of a balance function or a change in the assignment has been executed, a confirming signal can be given by means of a further light-emitting diode 26 and/or acoustically by means of the loudspeaker 33. However, a particular purpose of the light-emitting diode 26, which is labeled "conf" is to acknowledge when an entry device 20, 20' has been actuated to call one of the function modules 71, 72, ... into action. In this context, the confirming feedback prompted by an assignment can be different from the feedback signal prompted by the actuation of the entry device 10, 20' when calling up a function module 71, 72, .... For example, the respective signals can include blinking once in the first case, and more than once in the second case, or blinking at respectively different frequencies of pulsating light.

The applications program 61 of the balance 1 determines the assignment of the balance functions that is specific to the selected weighing process.

One of the measuring processes that can be performed includes, for example, the dosage-weighing of a selected substance, which is described in EP 0 216 035 B1, column 1. This procedure requires, e.g., that the door 4 of the weighing compartment 3 be opened and closed several times. The function of operating the doors is therefore preferably assigned to the left-hand entry device 20.

With an appropriate assignment, the right-hand entry device 20' can be used as a confirming key, where the operating- and/or applications program 61 assigns the function <RETURN> or <OK> to the freely selectable key function "F".

Thus, the user can actuate the door drive mechanism through the left-hand entry device 20 as often as necessary for the dosage-weighing process and subsequently signal the completion of the dosage-weighing process through the right-hand entry device 20, so that the control unit 6 can subsequently make a new assignment of the balance functions to the entry devices 20, 20'. For example, at this point the applications program can assign the "Print" function to the right-hand entry device 20', so that the user does not have to take his hand off the right-hand entry device 20' in order to print the results.

For the entire duration of the assignment of a function module 71, 72, ... in the case of the door-drive actuation described above, the light-emitting diode 21 is lit in the left-hand border strip 28. In the right hand border strip 28', the light-emitting diode 25 of the freely selectable balance function "F" is lit, to which the <RETURN>- or <OK>-function has been assigned. After the assignment of the right-hand entry device 20' has been changed to the new assignment "Print", the light-emitting diode 25 goes off and the light-emitting diode 22 is activated instead. The light-emitting diodes 26 in each case acknowledge the actuation of the respective entry device 20, 20', for example by blinking for a short time interval. This provides the user with the assurance that the program sequence is being executed correctly.

As illustrated in FIG. 2, an assigned balance function can be signaled by a single indication or by more than one indication. The function of operating the doors, which in the foregoing example is assigned to the left-hand entry device, is indicated by means of the light-emitting diode 21. However, this function can—additionally or alternatively—also be indicated by lighting up the corresponding operating element 10 and/or by displaying the word "DOOR" in the bottom section 32 of the display unit 30.

Figure 3:
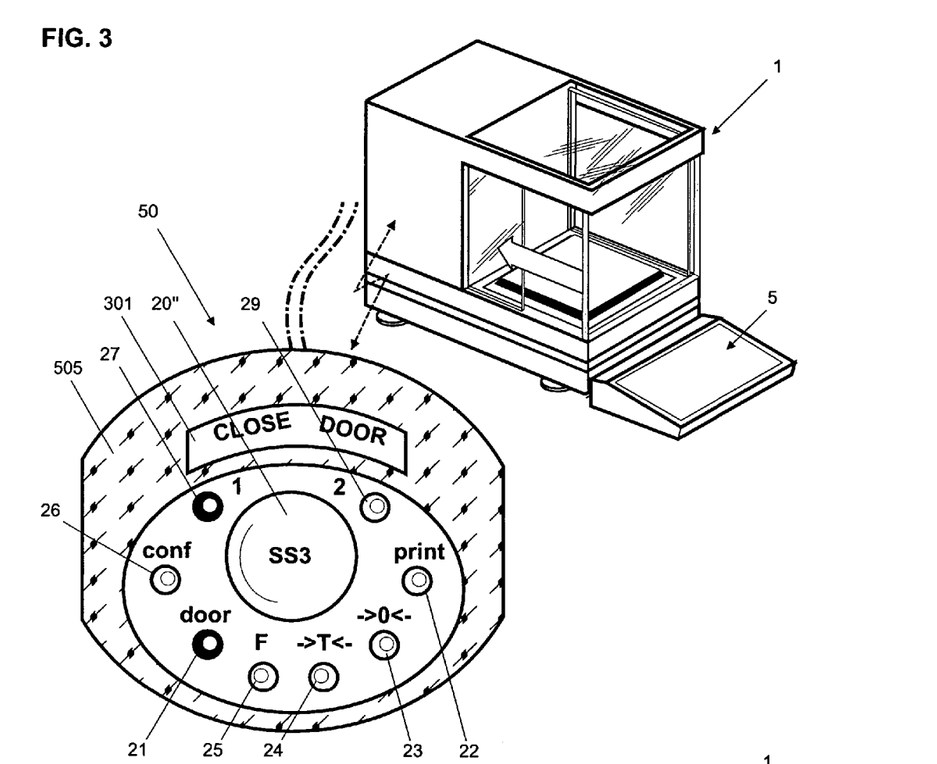
FIG. 3 represents the balance 1 of FIG. 1 with a freely movable input unit 50.

FIG. 3 shows the balance 1 with a wire-connected, freely movable input unit 50 in a housing 505 containing an entry device 20" as well as associated indicating means, a liquid crystal display 301 and—as in the indicating and operating unit 5 of FIG. 2—six light-emitting diodes 21, ..., 26 through which the user receives an indication or signal regarding the assignment, or possibly the change in the assignment, of a balance function as well as the confirmation of an actuation of the entry device. The input device 50 is movable, which allows it to be placed at the exact location where it is needed at any given time. In some cases, it can also be mounted in a holder at an appropriate location. With this high degree of flexibility, the input unit meets in particular the requirements of ergonomics.

The mobile, freely movable input unit 50, which can be connected to the balance 1 through an electrical cable or through wireless communication, e.g., by radio transmission, can be operated at a remote location from the balance 1, for example at the desk of the user. In the illustrated configuration, the liquid crystal display 301 therefore serves to indicate the required instructions or measuring results, so that the weighing process can in practice be controlled exclusively by means of the freely movable input unit 50. In this case, an indicating and operating unit 5 is not an indispensable requirement. If the balance 1 is equipped with an automated control module or a robot, the user can carry out a complete series of measurements without having to be present in the vicinity of the balance 1.

An entry device 20, 20', 20", forms an operative unit together with the light-emitting diodes 21, . . . , 25 for the balance functions and the light-emitting diode 26 for the confirming feedback.

The freely movable input unit 50 shown in FIG. 3 can further be used for the simultaneous control of a first balance 1 and a second balance 1'. The interrogations or assignments of function modules 71, 72, . . . by the respective control units 6, 6' of the two balances 1, 1' are executed sequentially. By means of the additional light-emitting diodes 27, 29, the user is given an indication as to which of the two balances 1, 1' needs to be actuated at a particular point in time.

Figure 4:
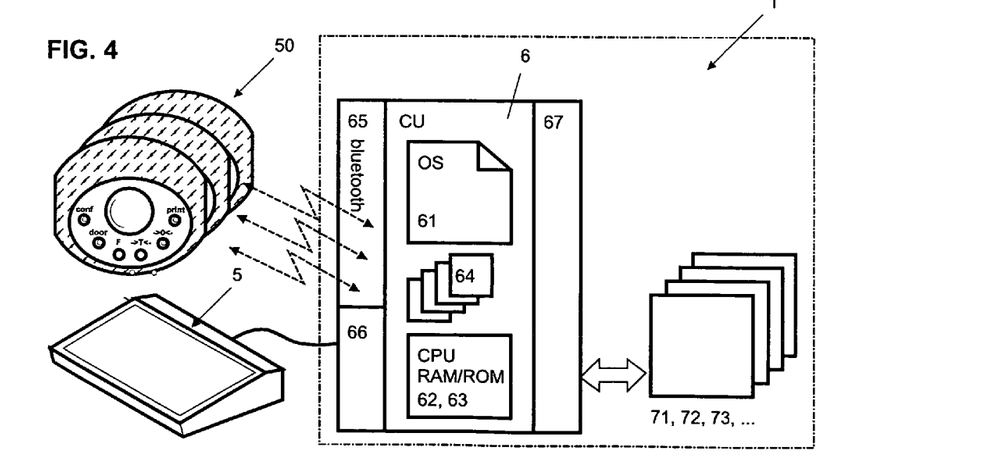
FIG. 4 represents an exemplary control unit 6 which is arranged in the balance 1 and which serves to process the command signals issued from the further input unit 5 and three freely movable input units 50, and to control the function modules 71, 72 . . . in accordance with the command signals.

FIG. 4 illustrates modules 61, . . . , 67 of the control unit 6 that is part of the balance 1, and the function modules 71, 72, 73, . . ., which are controlled by the control unit 6 and which are addressed as hardware modules by way of an interface module 67 or can be implemented as software modules inside the control unit 6.

In the illustrated example, an indicating and operating unit 5 is wire-connected as a further input unit to the control unit 6 by way of an additional interface module 66.

For the wireless connection of one or more input units 50, one could consider a communication by radio- or infrared transmission. For an exemplary embodiment, however, a network module 65 is proposed which works according to the Bluetooth™ standards whereby intelligent network units that are present within radio transmission range can be made to work together in a network.

As described in U.S. Patent Application Publication 2002/0120750, the disclosure of which is hereby incorporated by reference in its entirety, the Bluetooth concept provides the possibility by means of salutation- and service procedures to detect when network units within radio range are available for service and to configure the network accordingly. Thus, the control unit 6 can, e.g., detect the presence of a printer that is equipped with a Bluetooth-conforming network card 65 and—after performing the required configuration procedures—to use the services of the printer for printing the measurement results. The control unit 6 likewise detects the availability of information services or input functions from the freely movable input unit 50 and—after performing the required configuration procedures—sends interrogation signals to the freely movable input unit 50 and receives the response signals. Thus, the entry devices 20, 20', 20" perform the functions of sensors that deliver to the control unit 6 the information required for carrying out the weighing process. As previously mentioned, this information can be entered by the user, or there could be process units to scan or read the information off the weighing object, for example by means of a code reader, which is likewise being considered among the possible entry devices 20, 20', 20".

To process the signals transmitted by the entry device 20, 20', 20", the arrangement includes appropriate adapter modules 64 for each type of sensor, such as a proximity sensor, or a microphone for voice input, etc. Depending on the individual system, analog voice signals of the user may have to be converted into digital command signals, or digital signals may have to be decoded, or a switch position may have to be interrogated periodically.

Figure 5:
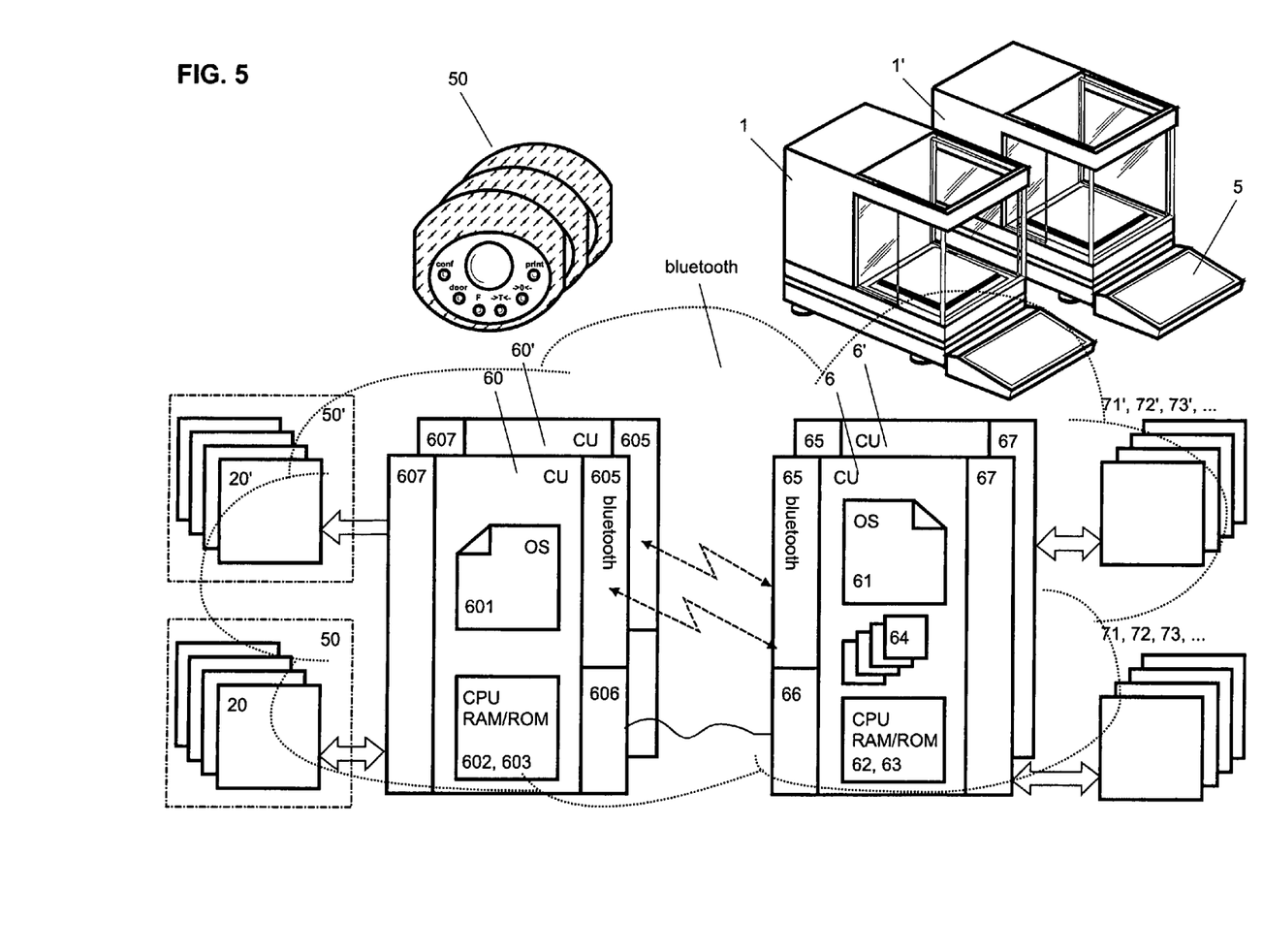
FIG. 5 represents an exemplary ad-hoc network consisting of a plurality of balances 1, 1' and input units 5, 50.

FIG. 5 represents an ad-hoc network having a plurality of balances 1, 1' and freely movable input units 50, wherein each balance has an indicating and operating unit 5 as a further input unit. Ad-hoc networks or mobile ad-hoc networks (MANETs) are local area networks (LANs) in which the network connections are typically established only on a temporary basis, e.g., for one session, and in the case of the present applications for, e.g., the duration of a measurement series.

For example when performing certain types of serial measurements, the balances 1, 1' can be operated with the indicating and operating unit 5 alone. If the user finds it necessary, he can activate a freely movable input unit 50 by switching it on. According to the Bluetooth protocol, the freely movable input unit 50 now receives so-called inquiry signals through which the control unit 6 of the balance 1 detects whether additional Bluetooth units are within range. In response, the freely movable input unit 50 returns its address data, which are subjected to a test in the control unit 6 to determine whether a connection is to be established. Thus, the control unit 6 can exclude units that are alien to the system and take up communication only with desired network units. This can be accomplished already by adding a suitable code to the inquiry signals, whereby the unwanted units are excluded. Thus, the user can establish an address list and thereby determine which network units are to be included in the network. By means of paging signals, the control unit 6 can subsequently make contact with the respective network unit and inquire what services are available from the network unit in case this information could not already be determined from the address data. Subsequently, the control unit 6 can reconfigure the expanded balance system, so that the services of the network unit can be used (see US 2002/0120750 A1, columns 1 and 2).

Thus, as the simplest solution, the control unit 6 can determine from the address data of the freely movable input unit 50 what sensors are used in the input unit, whereupon the control unit 6 implements the required adapter modules 64 required for the respective sensors. Of course, it is also possible to use a freely movable input unit 50 for two balances 1, 1' which send their addresses along with their respective inquiry transmissions, so that the freely movable input unit 50 can indicate to the user which of the balances 1, 1' he is currently communicating with. FIG. 5 illustrates that to perform these tasks, the freely movable input unit 50 has a processor 602, a memory unit 603, its own operating program 601, a network module 605 as well as interface modules 606, 607 that allow wire connections to be established to the at least one input device 20, 20', 20" and to the balance 1.

The balance 1 according to the invention has been described and illustrated in an exemplary embodiment. However, based on the teachings of the invention, a person skilled in the relevant art will be able to realize further embodiments. In particular, it is possible to use different technologies for the connection of the freely movable input unit 50 to the balance 1. Furthermore, the further input unit, normally an indicating and operating unit 5, or the input unit 50, and/or the housing 2 of the balance can be provided with one or more entry devices 20, 20', 20" which are equipped with sensors that serve to enter information and which work according to different principles (see U. Tietze, Ch. Schenk, Halbleiterschaltungstechnik, 11$^{th}$edition, 2$^{nd}$ printing, Springer Verlag, Berlin 1999, chapter 23, pages 1221-1223).

In the realization of more complex systems, the operating and applications procedures can be adapted individually to the users.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Method of operating a balance wherein a balance housing has a control unit that serves to execute an operating and/or applications program and is equipped for this task with a processor and a memory unit, and wherein the balance also has at least one entry device through which command signals can be given to the control unit, wherein the method comprises:

executing the operating program to assign several software function modules to an entry device in a programmed sequence for a weighing process;

informing the user, by means of respective one or more optical indicating means, when each of the several software function modules is assigned to the entry device in the programmed sequence; and indicating an actuation of the assigned entry device to the user by one or more signals by means of a confirming feedback device, wherein the entry device, the optical indicating means and the confirming feedback device are arranged separate from the balance housing, in the housing of a wireless or wire-connected freely movable input unit, wherein the control unit uses the command signals received from the entry device to control one of the several software function modules assignable to the entry device by the control unit dependent on the operating status of the operating and/or applications program.

2. Method according to claim 1, comprising:

indicating the completion of a new assignment of a function module to an entry device to the user by one or more signals by means of the confirming feedback device, wherein the confirming feedback device is arranged in the housing of the freely movable input unit.

3. Method according to claim 2, wherein the confirming feedback device is an acoustical signal of a sound generator and/or an optical signal of a liquid crystal display and/or of a further light-emitting diode.

4. Method according claim 1, comprising:

controlling at least one further device by means of the freely movable input unit, the connection of the freely movable input unit to the balance or to the additional device being indicated to the user by means of additional light-emitting diodes that are arranged in the housing of the freely movable input unit.

5. Method according to claim 4, wherein the one further device is an additional balance or a conveyor device.

6. Method according to claim 1, wherein subsequent to establishing a wire-borne or wireless connection between the balance housing and the freely movable input unit with a processor and a memory module, the control unit reads data stored in the freely movable input unit and takes said data into account in execution of the operating- and/or applications program, wherein said data relate to the freely movable input unit and/or to the user of the freely movable input unit.

7. Method according to claim 6, wherein the control unit and the freely movable input unit are equipped with network modules operating according to the Bluetooth™ standards, said modules serving to detect availability of services from the freely movable input unit and to use said services after communication has been established.

8. Method according to claim 1, wherein the software function modules are software modules serving to perform balance functions including at least one of: opening and closing of doors of a weighing compartment of the balance, zeroing of the balance, tare-setting for the weighing object, and printing of measurement results.

9. Method according to claim 1, wherein at least one freely selectable function module is assigned by the control unit to the entry device, and an indicating element which indicates that the assignment is effective.

10. Method of operating a balance according to claim 1, wherein there is a further input unit with operating elements, and one or more entry devices, the indicating means and the confirming feedback device are arranged in the housing of the balance or in the housing of the further input unit, wherein the one or more entry devices of a further input unit are actuated in a manner analogous to the one or more entry devices of the wireless or wire-connected freely movable input unit.

11. Method according to claim 1, wherein the optical indicating means is a liquid crystal display and/or light-emitting diodes assigned to the function modules, and wherein the confirming feedback device is an acoustical signal of a sound generator and/or an optical signal of a liquid crystal display and/or of a further light-emitting diode.

12. The method according to claim 1, wherein the entry device receives a voice input.

13. Method according to claim 1, wherein the executing comprises:

assigning, by the control unit, each of multiple balance control functions of the several software function modules to the same entry device, in the programmed sequence.

14. Balance comprising:

a balance housing having a control unit to execute an operating and/or applications program using a processor and a memory unit;

at least one entry device through which command signals can be given to the control unit, wherein the control unit is configured to use the command signals given by the entry device to control one of several software function modules assignable to the entry device by the control unit dependent on an operating status of the operating and/or applications program, wherein the operating program executes to assign the several software function modules to the entry device in a programmed sequence for a weighing process;

optical indicating means by which the user is informed through respective one or more optical signals when each of the several software function modules is assigned to the entry device in the programmed sequence; and at least one confirming feedback device through which an actuation of the assigned entry device and/or the execution of a new assignment of a software function module to the entry device can be indicated to the user, wherein the entry device, the optical indicating means and the confirming feedback device are arranged separate from the balance housing, in the housing of a wireless or wire-connected freely movable input unit.

15. Balance according to claim 14, comprising:
a further input unit with operating elements, wherein one or more entry devices, indicating means, and/or a confirming feedback device are arranged in the housing of the balance or in the housing of the further input unit, wherein the one or more entry devices, the indicating means, and the confirming feedback device are analogous to those that are arranged in the housing of the wireless or wire-connected freely movable input unit.

16. Balance according to claim 14, wherein the freely movable input unit is adapted for the control of at least one further device which can be a further balance or a conveyor device, and wherein the connection of the freely movable input unit to the balance housing or to the further device can be optically indicated to the user through one or more indications by means of additional light-emitting diodes.

17. Balance according to claim 14, wherein the control unit, after establishing a wire-borne or wireless connection between the balance housing and the freely movable input unit that is equipped with a processor and a memory module, is operable to read data stored in the freely movable input unit and relate to the freely movable input unit or to the user of the latter, and to take said data into account in execution of the operating- and/or applications program.

18. Balance according to claim 17, wherein the control unit and the freely movable input unit are equipped with network modules functioning according to Bluetooth™ standards, which are operable to detect availability of services from the freely movable input unit and, subsequent to establishing communication, to utilize said services.

19. Balance according to claim 14, wherein the entry device comprises:
an electromechanical sensor or an optical sensor.

20. Balance according to claim 14, wherein the software function modules are operable to perform weighing functions including at least one of opening and closing of doors of a weighing compartment of the balance zero-setting of the balance, tare-setting for the weighing object, and printing of measurement results.

21. Balance according to claim 14, wherein at least one freely selectable function module is assignable to an entry device, and an indicating element is provided for indicating that assignment of said function module is effective.

22. Balance according to claim 14, wherein the indicating means is a liquid crystal display and/or light-emitting diodes assigned to the function modules, and wherein the confirming feedback device is a further light-emitting diode, and/or a liquid crystal display and/or a sound generator, in particular a loudspeaker.

23. Balance according to claim 14, wherein the entry device comprises at least one of:
an infrared proximity sensor, a code reader, an electro-acoustical sensor, an ultrasound proximity sensor, and an electromagnetic sensor.

24. The balance according to claim 14, wherein the entry device comprises: an adapter module with a microphone for voice input.

25. Balance according to claim 14, wherein the operating program of the control unit assigns each of multiple balance control functions to the same entry device using the programmed sequence.

26. Method of operating a balance wherein a balance housing has a control unit that serves to execute a program for dosage weighing of a selected substance and is equipped for this task with a processor and a memory unit, and wherein the balance also has at least one entry device through which command signals can be given to the control unit, wherein the method comprises:
executing the program to assign several software function modules to an entry device in a programmed sequence for a dosage-weighing process;
informing the user, by means of respective one or more optical indicating means, when each of the several software function modules is assigned to the entry device; and
indicating the actuation of the assigned entry device to the user by one or more signals by means of a confirming feedback device, wherein the entry device, the optical indicating means and the confirming feedback device are arranged separate from the balance housing, in the housing of a wireless or wire-connected freely movable input unit, wherein the control unit uses the command signals received from the entry device to control one of the several software function modules assignable to the entry device by the control unit dependent on the operating status of the program for dosage weighing.

27. A balance comprising:
a balance housing having a control unit to execute an operating- and/or applications program using a processor and a memory unit;
at least one entry device through which command signals can be given to the control unit, wherein the control unit is configured to use the command signals given by the entry device to control one of several software function modules assignable to the entry device by the control unit dependent on an operating status of the operating and/or applications program, wherein the operating program executes to assign the several software function modules to the entry device in a programmed sequence for a weighing process;
indicating means by which the user is informed through respective one or more optical signals when each of the software function modules is assigned to the entry device in the programmed sequence;
at least one confirming feedback device through which the actuation of the assigned entry device and/or the execution of a new assignment of a software function module to the entry device can be indicated to the user; and
a wireless or wire-connected freely movable input unit comprising a housing, separate from the balance housing which houses the at least one entry device, the optical indicating means associated with the at least one entry device, and the at least one confirming feedback device.

28. The balance according to claim 27, wherein the freely movable input unit comprises a switch as an entry device, several light-emitting diodes or a liquid crystal display, through which the user receives an indication or signal regarding the assignment, or possibly the change in the assignment, of a balance function and a light-emitting diode, through which the user receives the confirmation of an actuation of the entry device.

* * * * *